US009204526B2

(12) United States Patent
Laurisch et al.

(10) Patent No.: US 9,204,526 B2
(45) Date of Patent: Dec. 1, 2015

(54) COOLING PIPES, ELECTRODE HOLDERS AND ELECTRODE FOR AN ARC PLASMA TORCH

(75) Inventors: Frank Laurisch, Finsterwalde (DE); Volker Krink, Finsterwalde (DE); Ralf-Peter Reinke, Finsterwalde (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 1009 days.

(21) Appl. No.: 13/320,202

(22) PCT Filed: Mar. 24, 2010

(86) PCT No.: PCT/DE2010/000325

§ 371 (c)(1), (2), (4) Date: Feb. 9, 2012

(87) PCT Pub. No.: WO2010/115397

PCT Pub. Date: Oct. 14, 2010

(65) Prior Publication Data

US 2012/0132626 A1 May 31, 2012

(30) Foreign Application Priority Data

Apr. 8, 2009 (DE) ......................... 10 2009 016 932

(51) Int. Cl.
*B23K 10/00* (2006.01)
*H05H 1/34* (2006.01)

(52) U.S. Cl.
CPC ......... *H05H 1/34* (2013.01); *H05H 2001/3436* (2013.01)

(58) Field of Classification Search
CPC ............. H05H 1/34; H05H 1/28; H05H 1/38; H05H 2001/3436
USPC .......... 219/121.48, 121.49, 121.52, 121.5, 75
See application file for complete search history.

(56) References Cited

U.S. PATENT DOCUMENTS 3,408,518 A 10/1968 Strupczewski .................. 313/32
4,625,094 A 11/1986 Marhic et al. ................. 219/121

(Continued)

FOREIGN PATENT DOCUMENTS

DE 87361 1/1972
DE 2544402 A1 4/1976

(Continued)

OTHER PUBLICATIONS

International Search Report—PCT/WO 2010/115397 A3.

*Primary Examiner* — Mark Paschall
(74) *Attorney, Agent, or Firm* — Jonathan M. D'Silva; MacDonald, Illig, Jones & Britton LLP

(57) ABSTRACT

A cooling tube for an arc plasma torch, comprising an elongate body with an end which can be arranged in the open end of an electrode, and a coolant duct extending therethrough, characterized in that at said end there is a bead-like thickening of the wall of the cooling tube pointing inwards and/or outwards, and an arrangement of a cooling tube for an arc plasma torch, comprising an elongate body with a rear end which can be releasably connected to an electrode holder of an arc plasma torch, and a coolant duct extending therethrough, and an electrode holder for an arc plasma torch, comprising an elongate body with an end for receiving an electrode and a hollow interior, and characterized in that on the outer surface of the cooling tube at least one projection is provided for centring the cooling tube in the electrode holder.

21 Claims, 17 Drawing Sheets

(56) References Cited

U.S. PATENT DOCUMENTS

| | | | | |
|---|---|---|---|---|
| 4,954,688 | A | 9/1990 | Winterfeldt | 219/121.5 |
| 5,278,387 | A | 1/1994 | Borne | 219/121.39 |
| 6,147,318 | A | 11/2000 | Marhic | 219/121.52 |
| 6,252,194 | B1 | 6/2001 | Marhic | 219/121.52 |
| 7,019,255 | B2 | 3/2006 | Brandt et al. | 219/121.49 |
| 2006/0049150 | A1 | 3/2006 | Severance, Jr. | 219/121.52 |

FOREIGN PATENT DOCUMENTS

| | | | |
|---|---|---|---|
| DE | 3840485 | A1 | 6/1990 |
| DE | 4018423 | A1 | 12/1991 |
| DE | 698 02 062 | T2 | 6/2002 |
| DE | 202004021644 | U1 | 9/2009 |
| WO | WO 9010366 | A1 | 9/1990 |
| WO | WO 02/098190 | A1 | 12/2002 |
| WO | WO 2008/067285 | A2 | 6/2008 |
| WO | WO 2010/115397 | A2 | 10/2010 |

COOLING PIPES, ELECTRODE HOLDERS AND ELECTRODE FOR AN ARC PLASMA TORCH

BACKGROUND

The present invention relates to cooling tubes, electrode holders and electrodes for an arc plasma torch. The invention further relates to arrangements thereof and an arc plasma torch with such tubes, holders, electrodes, and arrangements.

A plasma is an electrically conductive gas consisting of positive and negative ions, electrons and excited and neutral atoms, and molecules, which is heated thermally to a high temperature. Various gases are used as plasma gases, such as mono-atomic argon and/or the diatomic gases hydrogen, nitrogen, oxygen or air. These gases are ionised and dissociated by the energy of an electric arc. The electric arc is constricted by a nozzle and is then referred to as a plasma jet.

The parameters of a plasma jet can be heavily influenced by the design of a nozzle and electrode. Such parameters of the plasma jet are, for example, the diameter of the jet, temperature, energy density, and the flow rate of the gas. In plasma cutting, for example, the plasma is constricted by a nozzle, which can be cooled by gas or water. In this way, energy densities of up to $2\times10^6$ W/cm$^2$ can be achieved. Temperatures of up to 30,000° C. arise in the plasma jet, which, in combination with the high flow rate of the gas, make it possible to achieve very high cutting speeds on materials.

Because of the high thermal stress level on nozzles, nozzles are usually made from a metallic material, preferably copper, because of copper's high electrical conductivity and thermal conductivity. The same is true of electrodes, though electrodes are also commonly made of silver. A nozzle is often inserted into an arc plasma torch, called a plasma torch for short. The main elements of a plasma torch include a plasma torch head, a nozzle cap, a plasma gas conducting member, a nozzle, a nozzle holder, an electrode with an electrode insert, and, in modern plasma torches, a holder for a nozzle protection cap, and a nozzle protection cap. Inside the electrode, there is, for example, a pointed electrode insert made from tungsten, which is suitable when non-oxidising gases are used as the plasma gas, such as a mixture of argon and hydrogen. A flat-tip electrode, the electrode insert of which is made of hafnium, is also suitable when oxidising gases are used as the plasma gas, such as air or oxygen.

In order to improve the service life for a nozzle and an electrode, a cooling fluid is often used, such as water, though cooling may also be effected with a gas. For this reason, a distinction is made between liquid-cooled and gas-cooled plasma torches.

Electrodes are often made from a material with good electric and thermal conductivity, e.g. copper and silver or their alloys, and an electrode insert consisting of a temperature-resistant material, e.g. tungsten, zirconium or hafnium. For plasma gases containing oxygen, zirconium may be used. Because of its superior thermal properties, hafnium is, however, better suited, since its oxide is more temperature-resistant.

In order to improve the service life for an electrode, a refractory material is often introduced into the holder as an emission insert, which is then cooled. The most effective form of cooling is liquid cooling.

A plasma torch, can be configured with an electrode that is hollow in the interior and with a cooling tube inside. In Former East Germany Document DD 87 361, for example, water flows through the interior of the cooling tube, streams against the bottom of the electrode, and then flows back between the interior surface of the electrode and the exterior surface of the cooling tube.

The electrode often has a cylindrical or conical region extending inwards, with the cooling tube projecting beyond it. The coolant flows around this region and is intended to ensure a better exchange of heat between the electrode and the coolant.

Nevertheless, it is common for heating to occur at the electrode. This, when the apparatus is switched on for a long time, becomes apparent in the form of considerable discoloration of the electrode holder and rapid burn-back of the electrode insert.

SUMMARY

The invention addresses the problem of preventing, or at least reducing, overheating of electrodes of arc plasma torches. According to the invention, this problem is solved by a cooling tube for an arc plasma torch, comprising an elongate body with an end that can be disposed in the open end of an electrode and with a coolant duct extending therethrough with a bead-like thickening of the wall of the cooling tube pointing inwards and/or outwards.

The invention also addresses this problem further with an arrangement of a cooling tube and an electrode having a hollow elongate body with an open end for arranging the front end of a cooling tube and a closed end, the bottom surface of the open end having a projecting region, over which the end of the cooling tube extends, and the thickening extending in the longitudinal direction over at least the projecting region.

The invention further addresses this problem with a cooling tube for an arc plasma torch, comprising an elongate body with a rear end that can be releasably connected to an electrode holder of an arc plasma torch and a coolant duct extending therethrough, an external thread being provided for releasably connecting the rear end to an electrode holder, with a cylindrical outer surface adjoining this for centring the cooling tube relative to the electrode holder.

Furthermore, the invention also addresses this problem with an electrode holder for an arc plasma torch, comprising an elongate body with an end for receiving an electrode and with a hollow interior, wherein an internal thread is provided in the hollow interior for screwing in a rear end of a cooling tube, with a cylindrical inner surface adjoining this for centring the cooling tube relative to the electrode holder.

The invention contemplates in some embodiments an arrangement with a cooling tube and an electrode holder wherein the cooling tube is screwed together with the electrode holder by means of the external thread and the internal thread.

The invention contemplates some embodiments that include an arrangement of a cooling tube for an arc plasma torch, comprising an elongate body with a rear end that can be releasably connected to an electrode holder of an arc plasma torch and a coolant duct extending therethrough, and with an electrode holder for an arc plasma torch, comprising an elongate body with an end for receiving an electrode and with a hollow interior in which on the outer surface of the cooling tube at least one projection is provided for centring the cooling tube in the electrode holder.

In some contemplated embodiments, an electrode for an arc plasma torch, comprises a hollow elongate body with an open end for arranging the front end of a cooling tube therein and a closed end, the open end having an external thread for screwing together with the internal thread of an electrode holder, wherein adjoining the external thread, towards the closed end, there is a cylindrical outer surface for centring the electrode relative to the electrode holder.

In other contemplated embodiments, an electrode holder for an arc plasma torch is provided, comprising an elongate body with an end having an internal thread for receiving an electrode and with a hollow interior, wherein adjoining the internal thread, there is a cylindrical inner surface for centring the electrode relative to the electrode holder.

In some contemplated embodiments, an arrangement is provided with an electrode and an electrode holder wherein the electrode is screwed together with the electrode holder by means of the external thread and the internal thread.

In some contemplated embodiments, the thickening extends over at least one millimeter in the longitudinal direction of the cooling tube. In some embodiments, this thickening can lead to an increase in the external diameter by at least 0.2 millimeters and/or to a reduction of the internal diameter by at least 0.2 millimeters.

In some contemplated arrangements according to the invention, an electrode holder can be provided having an elongate body with an end for receiving the electrode and with a hollow interior, wherein the cooling tube projects into the hollow interior and at least one projection is provided on the outer surface of the cooling tube for centring the cooling tube in the electrode holder.

It is contemplated that in some embodiments, a first group of projections can be arranged peripherally and spaced apart from one another. In particular, in such arrangements, this connection can be arranged so that the projections are positioned peripherally and spaced apart from one another, with the second group offset axially from the first group. Some embodiments further contemplate the second group of projections to be offset peripherally relative to the first group of projections.

In some more specific embodiments, cooling tube can be provided with a stop face for fixing the cooling tube axially in the electrode holder. Other embodiments may allow the cylindrical outer surface to have a peripheral groove. In some particular embodiments, an O-ring may be disposed in the groove for sealing purposes.

According to some contemplated embodiments of the invention, the cylindrical outer surface can include an external diameter that is exactly the same size as or larger than the external diameter of the external thread. In some embodiments a stop face can be provided for fixing the cooling tube axially in the electrode holder.

In further contemplated embodiments, the cylindrical inner surface can have an internal diameter which is exactly the same size as or larger than the internal diameter of the internal thread. The principle applicable here is D6.1=(D.61*a*−D6.1*i*)/2 ("a" indicating external and "i" indicating internal).

In some additional contemplated embodiments, the cooling tube and the electrode holder are designed such that towards the front end, there is an annular gap between them. It is further contemplated that in some embodiments, the cylindrical outer surface of the cooling tube and the cylindrical inner surface of the electrode holder have narrow tolerances relative to one another.

In other contemplated embodiments, a first group of projections can be arranged peripherally and spaced apart from one another. In more specific embodiments, exactly three projections can be provided, which can be arranged to be offset from one another by 120°. In addition, a second group of projections can be provided, arranged peripherally and spaced apart from one another, with the second group offset axially relative to the first group. The second group of projections can likewise consist of exactly three projections, which can be arranged to be offset from one another by 120°. In some cases, the second group of projections can be advantageously offset peripherally relative to the first group of projections. The offset can be 60°, for example.

It is further contemplated that a stop face for fixing the electrode axially in the electrode holder can be provided. In particular, the cylindrical outer surface can have a peripheral groove with an O-ring disposed in it for sealing purposes.

According to some contemplated and advantageous embodiments, the cylindrical outer surface can have an external diameter which is exactly the same size as or larger than the external diameter of the external thread.

In some embodiments it is advantageous for the cylindrical inner surface to have an internal diameter that is exactly the same size as or larger than the internal diameter of the internal thread, such that D6.4=(D6.4*a*−D6.4*i*)/2.

In some contemplated embodiment it is advantageous for the cylindrical outer surface of the electrode and the cylindrical inner surface of the electrode holder to have narrow tolerances relative to one another. It is customary here to use a so-called transition fit, meaning, for example, an outer tolerance: 0 to −0.01 mm, and an inner tolerance: 0 to +0.01 mm.

The invention recognizes the surprising finding that thickening causes gaps between a cooling tube and an electrode to become narrower, but without reducing the cross-section in the rear region of an arc plasma torch head. In this way, a high flow speed of coolant is achieved at the front, between the cooling tube and the electrode, which improves heat transfer. Heat transfer is additionally or alternatively improved by suitably centring components of the plasma torch head.

The invention further recognizes that heat transfer between an electrode and coolant is not ideal. In this connection, pressure, flow speed, volume flow and/or pressure differential of the coolant in the flow path may not be adequate in the front region, in which the cooling tube projects beyond the inwardly extending region of the electrode. In addition, the problem has been recognised that an annular gap between the electrode and cooling tube may differ in size on its circumference if not centrally positioned. This results in an uneven distribution of coolant around the inwardly extending region of the electrode, impairing further cooling.

BRIEF DESCRIPTION OF THE DRAWINGS

Further features and advantages of the invention will become clear from the enclosed claims the following description, in which several embodiments are illustrated in detail with reference to the schematic drawings, wherein:

DETAILED DESCRIPTION

Figure 1:
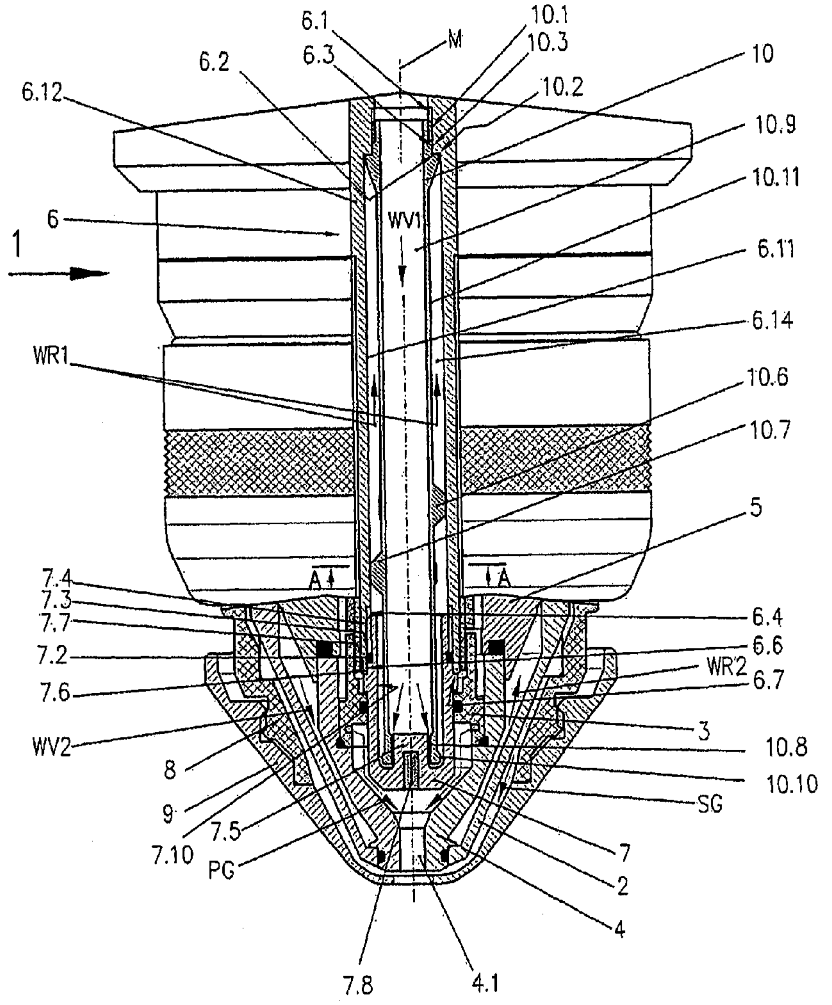
FIG. 1 shows a longitudinal sectional view through a plasma torch head in accordance with a first particular embodiment of the invention.

FIG. 1 shows a first particular embodiment of a plasma torch head 1 according to the present invention; The plasma torch head has an electrode 7, an electrode holder 6, a cooling tube 10, a nozzle 4, a nozzle cap 2, and a gas line 3. The nozzle 4 is fixed in place by the nozzle cap 2 and a nozzle holder 5. The electrode holder 6 has a holder body 6.12, holder end 6.13, hollow interior 6.14, and receives the electrode 7 and the cooling tube 10 via a thread in each case, namely the internal thread 6.4 and the internal thread 6.1. The gas line 3 is located between the electrode 7 and the nozzle 4 and causes a plasma gas PG to rotate. In addition, the plasma torch head 1 has a secondary gas protection cap 9, which in this embodiment is screwed onto a nozzle protection cap holder 8. A secondary gas SG, which protects the nozzle 4, especially the nozzle tip, flows between the secondary gas protection cap 9 and the nozzle cap 2.

Figure 2:
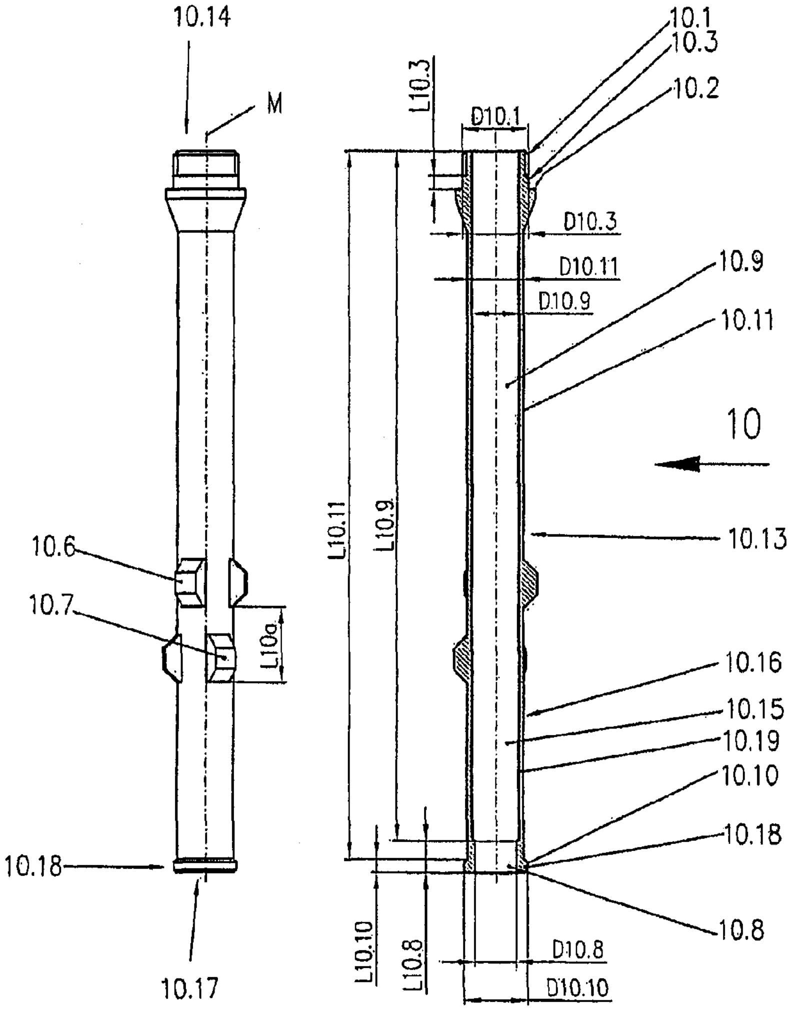
FIG. 2 shows an individual view of a cooling tube of the plasma torch head shown in FIG. 1, seen from above (left) and in a longitudinal sectional view (right)

The cooling tube 10 (see also FIG. 2) is attached to the rear part of the electrode holder 6, and the electrode 7 is attached to the front part of the electrode holder 6. The cooling tube 10 has an elongate tube body 10.13 having a front end 10.17 and rear end 10.14, as well as a coolant duct 10.15. The cooling tube 10 projects beyond a region 7.5 of the electrode 7 extending inwardly, i.e. away from the nozzle tip and closed end 7.13 and toward an open end 7.12 (see also FIGS. 3 and 8). In that region, the internal diameter D10.8 over the length L10.8 of the cooling tube 10 is smaller than the internal diameter D10.9 of the internal portion 10.9 of the cooling tube 10 facing backwards, and the external diameter D10.10 over the length L10.10 of the cooling tube 10 is larger than the external diameter D10.11 of the external portion 10.11 of the cooling tube 10 facing backwards. This thus gives rise to a bead-like thickening 10.18 of the wall 10.19 of the cooling tube, facing inwards and outwards. This ensures that the flow cross-section available to the coolant is only constricted in the front internal portion 10.8 and front external portion 10.10, in which a high flow velocity of a coolant is required for good heat dispersal, and the greatest possible flow cross-section is available in the rear region in order to keep the pressure drops in the rear internal portion 10.9 and rear external portion 10.11 as low as possible. A coolant first flows in the flow path through WV1 (water supply line 1) into the interior of the cooling tube 10 and encounters the inwardly extending region 7.5 of the electrode 7, before flowing back via the flow path WR1 (water return line 1) in the space between the cooling tube 10 and the electrode 7 and electrode holder 6.

The plasma jet (not shown) has its point of attack on the outer surface of an electrode insert 7.8. That is where the most heat arises, which has to be dissipated in order to ensure a long service life of the electrode 7. The heat is conducted via the electrode 7 made from copper or silver to the coolant in the interior of the electrode.

In the region in which the cooling tube 10 projects beyond the inwardly extending region 7.5 of the electrode 7, the gap between the opposing surfaces of the front internal portion 10.8 of the cooling tube and the electrode region 7.5 of the electrode 7 and of the front external portion 10.10 and the inner surface 7.10 of the electrode is very small. It is in the region of 0.1 to 0.5 mm.

In addition, coolant flows in the space between the nozzle 4 and the nozzle cap 2 via a flow path WV2 (water supply line 2) and WR2 (water return line 2).

Figure 5:
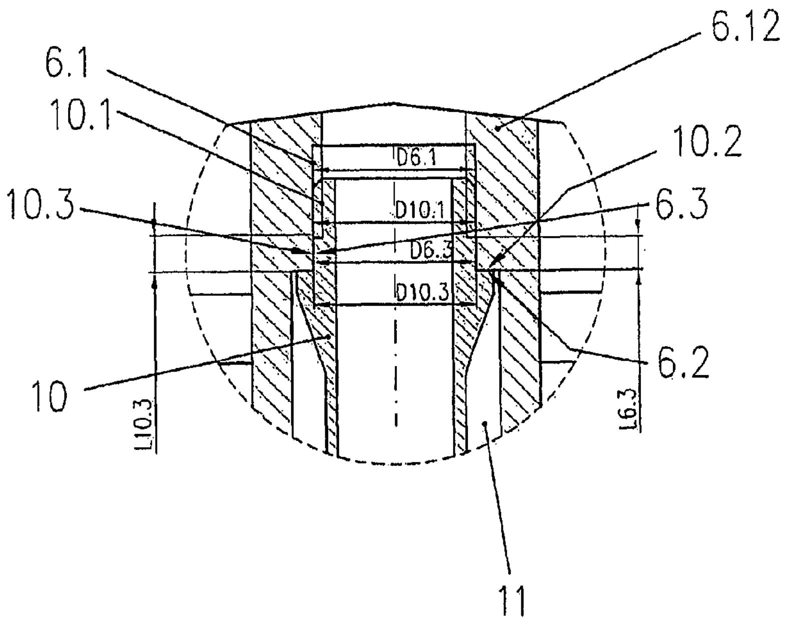
FIG. 5 shows details of the connection between the electrode holder and the cooling tube of the plasma torch head shown in FIG. 1.
Figure 6:
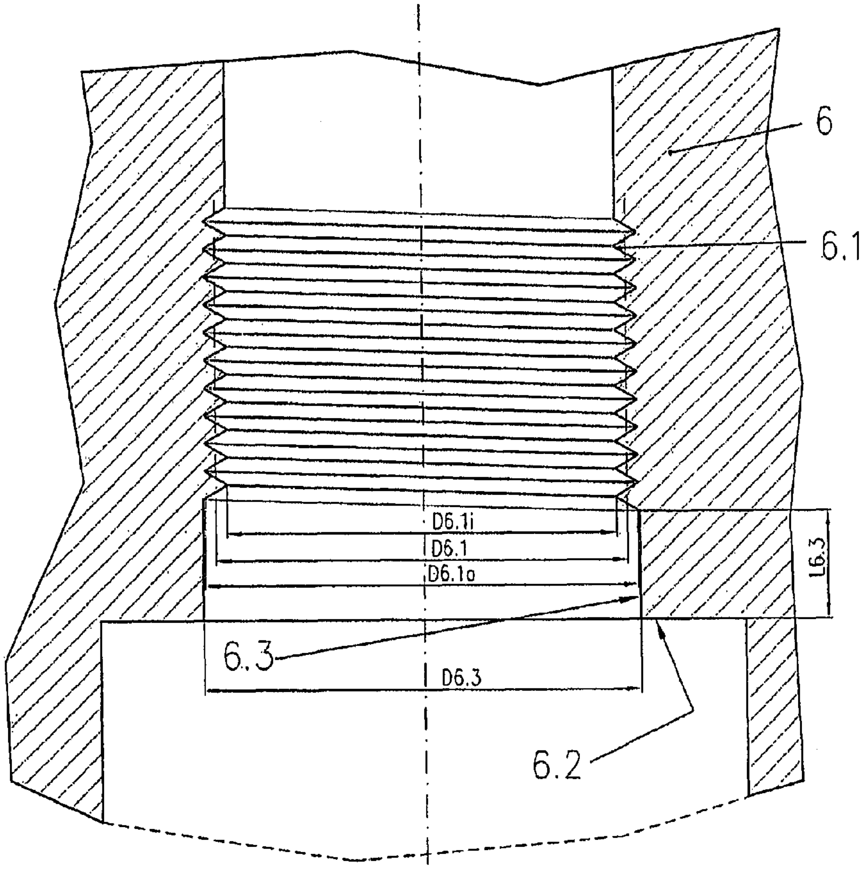
FIG. 6 shows details of the electrode holder shown in FIG. 5, partially in a longitudinal sectional view.

As is also illustrated in FIGS. 5 and 6, the cooling tube 10 is screwed to the electrode holder 6 via the external thread 10.1 and the internal thread 6.1. An annular gap 11 is positioned between the cooling tube 10 and electrode holder 6. The cooling tube 10 and the electrode holder 6 are centred relative to one another by means of the cylindrical outer surface 10.3 of the cooling tube 10 and the cylindrical inner surface 6.3 of the electrode holder 6. These have narrow tolerances relative to one another in order to achieve good centring. In this context, the tolerance of the cylindrical outer surface 10.3 can be the nominal size of the external diameter D10.3 from 0 to −0.01 mm and the tolerance of the cylindrical inner surface 6.3 can be the nominal size of the internal diameter D6.3 from 0 to +0.01 mm. The internal thread 6.1 of the electrode holder 6 and the external thread 10.1 of the cooling tube 10 have sufficient play relative to one another so that the cooling tube 10 can easily be screwed into the electrode holder 6. It is only just before tightening that the centring occurs by means of the cylindrical inner surface 6.3 and cylindrical outer surface 10.3, which have narrow tolerances and face each other in the screwed-in state.

The external diameter D10.3 of the cylindrical outer surface 10.3 of the cooling tube 10 is at least the same size as or larger than the external diameter D10.1 of the external thread 10.1. The internal diameter D6.3 of the cylindrical inner surface 6.3 of the electrode holder 6 is larger than the minimum internal diameter D6.1 of the internal thread 6.1, where D6.1=(D6.1*a*−D6.1*i*)/2.

The centring described above ensures the parallel alignment of the cooling tube 10 to the axis M of the plasma torch head 1, a uniform annular gap between the cooling tube 10 and the electrode region 7.5 and thus a uniform distribution of the coolant flow in the electrode interior, especially in the region of the front portion 10.8 of the cooling tube 20 and of the inwardly extending electrode region 7.5. When screwed in tightly, the stop faces 10.2 and 6.2 rest on one another. This causes the cooling tube 10 to be fixed axially in the electrode holder 6.

Figure 3:
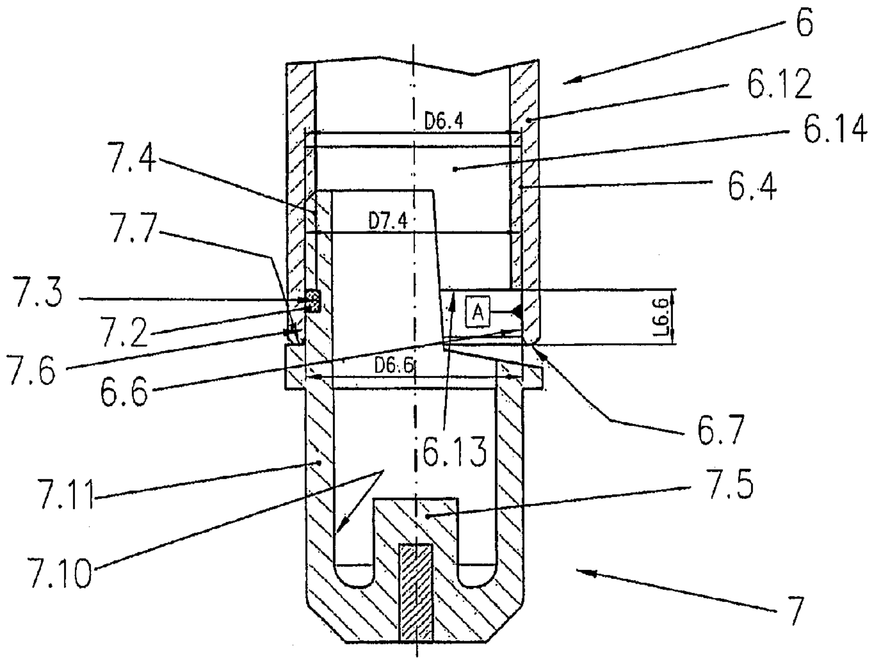
FIG. 3 shows details of the connection between the electrode and the electrode holder in a longitudinal sectional view of the plasma torch head shown in FIG. 1.
Figure 4:
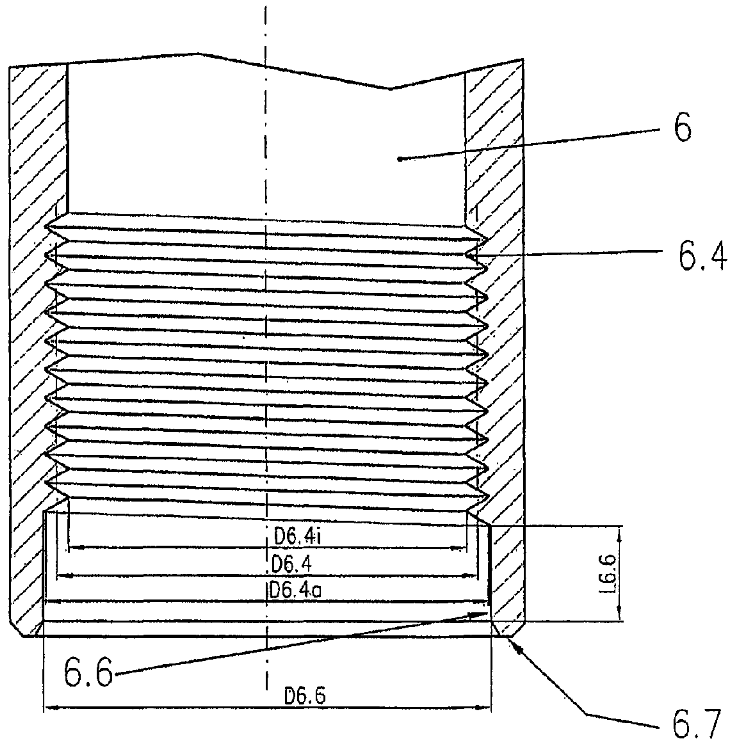
FIG. 4 shows details of the electrode holder shown in FIG. 3, partially in a longitudinal section.

As is also illustrated in FIGS. 3 and 4, the electrode 7 is screwed to the electrode holder 6 by means of the external thread 7.4 and the internal thread 6.4. The electrode 7 and the electrode holder 6 are centred relative to one another by means of the cylindrical outer surface 7.6 of the electrode 7 and the cylindrical inner surface 6.6 of the electrode holder 6. The outer surfaces have narrow tolerances relative to one another in order to achieve good centring. In this context, the tolerance of the cylindrical outer surface can be the nominal size of the external diameter D7.6 from 0 to −0.01 mm and the tolerance of the cylindrical inner surface 6.3 can be the nominal size of the internal diameter D6.6 from 0 to +0.01 mm. The internal thread 6.4 of the electrode holder 6 and the external thread 7.4 of the electrode 7 have sufficient play relative to one another, so that the electrode 7 can easily be screwed into the electrode holder 6. It is only just before tightening that the centring occurs by means of the cylindrical surfaces 6.6 and cylindrical outer surface 7.6, which have narrow tolerances and face each other in the screwed-in state.

Figure 8:
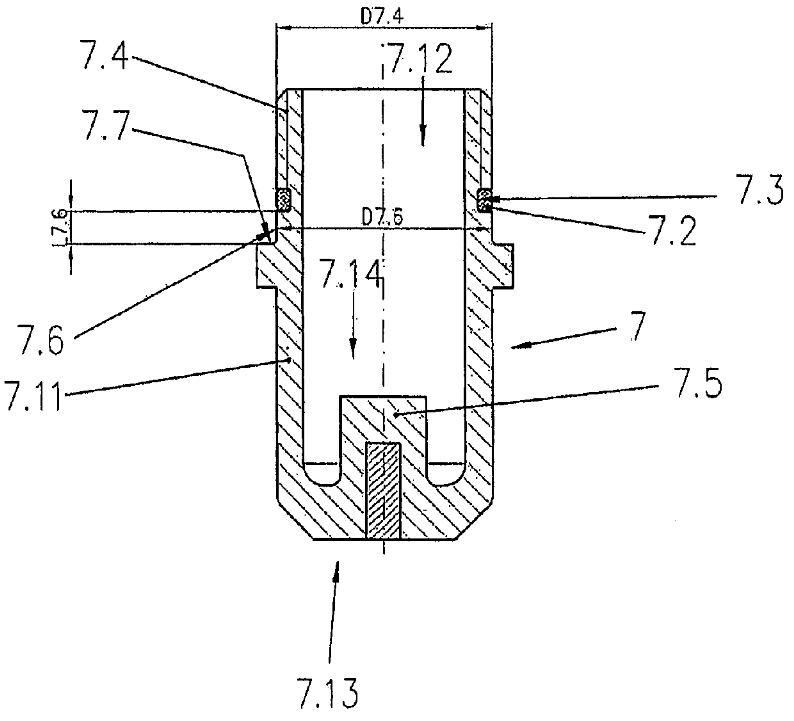
FIG. 8 shows an individual illustration of the electrode of the plasma torch head shown in FIG. 1, in a longitudinal sectional view.

The external diameter D7.6 of the cylindrical outer surface 7.6 of the electrode 7 is at least the same size as or larger than the maximum external diameter D7.4 of the external thread 7.4 (see FIG. 8). The internal diameter D6.6 of the cylindrical inner surface 6.6 of the electrode holder 6 is larger than the internal diameter D6.4 of the internal thread 6.4, where D6.4=(D6.4*a*−D6.4*i*)/2.

The centring described above is necessary for the parallel alignment of the electrode 6 to the axis M of the plasma torch head 1, which in turn ensures a uniform distribution of the coolant flow in the electrode interior, especially in the region of the front internal portion 10.8 of the cooling tube 10 and of the inwardly extending region 7.5 of the electrode 7. The purpose of centring the electrode 7 relative to the electrode holder 6 is to secure the centricity relative to the other components of the plasma torch head, especially the nozzle 4. The latter serves to form a uniform plasma jet, which is partly determined by the positioning of the electrode insert 7.8 of the electrode 7 relative to the nozzle bore 4.1 of the nozzle 4. In addition, the cylindrical outer surface 7.6 has a groove 7.3 with an O-ring 7.2 disposed in it for sealing purposes. When screwed in tightly, the stop faces 7.7 and 6.7 rest on one another. This causes the electrode 7 to be fixed axially in the electrode holder 6.

Figure 7:
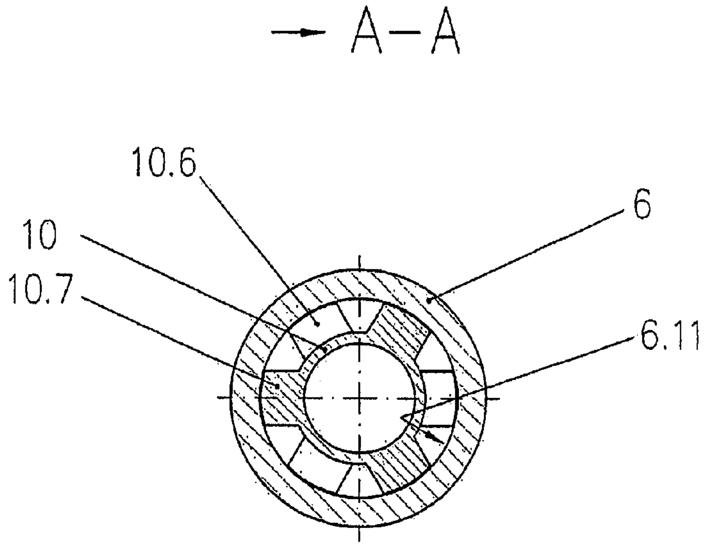
FIG. 7 shows a detail (section A-A) of the connection between the electrode holder and the cooling tube of the plasma torch head shown in FIG. 1.

A further improvement in the radial centring of the cooling tube 10 relative to the electrode holder 6 is obtained by means of a group of projections 10.6 and a group of projections 10.7, which are located on the outer surface of the cooling tube 10. The projections fix the distance from the inner surface of the electrode holder 6. In this embodiment, there are three projections 10.6 and 10.7 per group distributed offset by 120° on the periphery of the outer surface of the cooling tube and also with an offset L10*a* in the longitudinal direction of the cooling tube 1 relative to one another (see FIGS. 2 and 7). The projections 10.6 are arranged in this case offset by 60° relative to the projections 10.7. This offsetting improves the radial centring. At the same time, the projections 10.7 can be used as a counterpart for a tool (not shown) for screwing the cooling tube 10 in and out. The projections 10.6 and 10.7 have a rectangular cross-section when seen from the front region 10.8. This means that only the corners of the rectangular cross-sections rest on the cylindrical inner surface 6.11 of the electrode holder 6. In this way, a high degree of centricity is achieved, while at the same time preserving ease of assembly.

Figure 9:
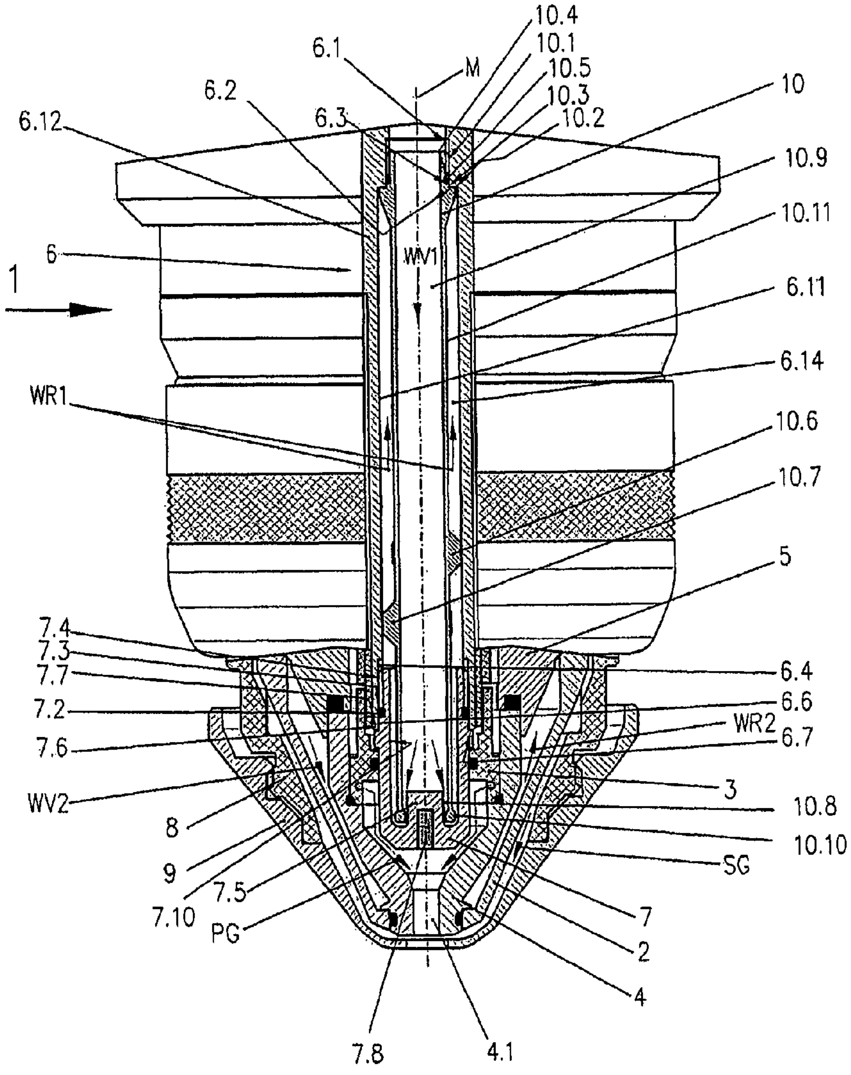
FIG. 9 shows a longitudinal sectional view through a plasma torch head in accordance with a particular contemplated embodiment of the present invention.
Figure 10:
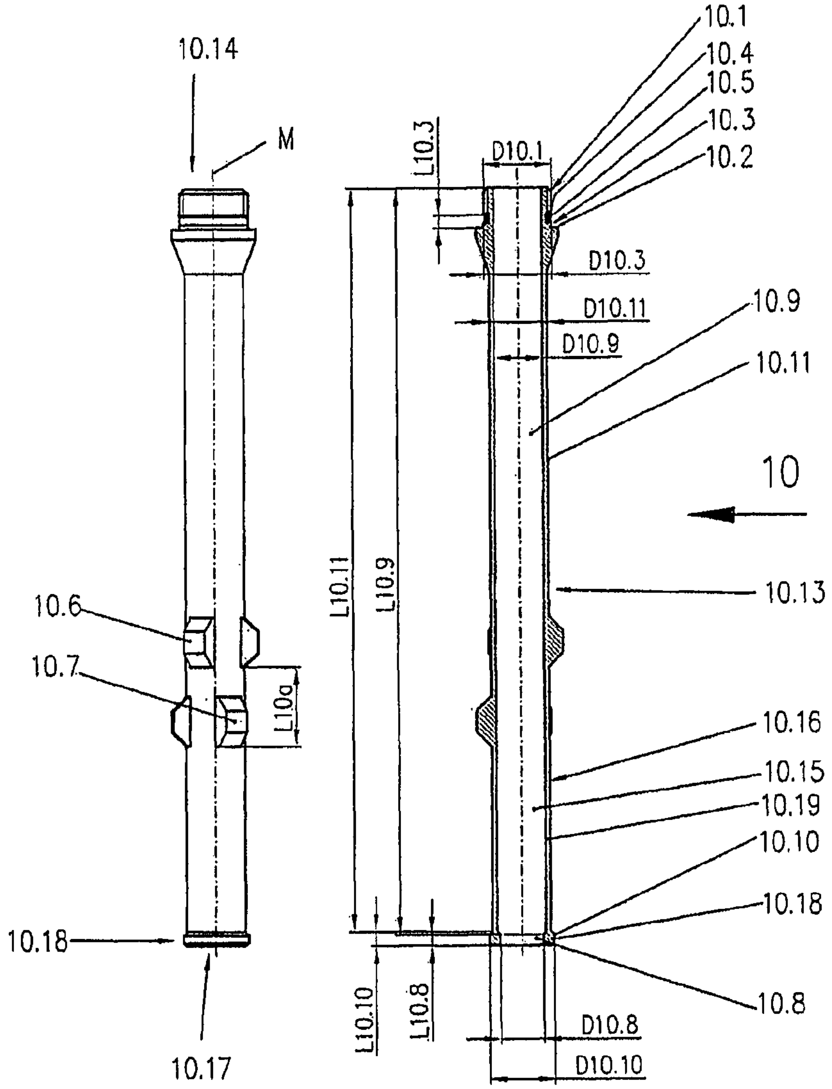
FIG. 10 shows an individual view of a cooling tube of the plasma torch head shown in FIG. 9, seen from above (left) and in a longitudinal sectional view (right)
Figure 11:
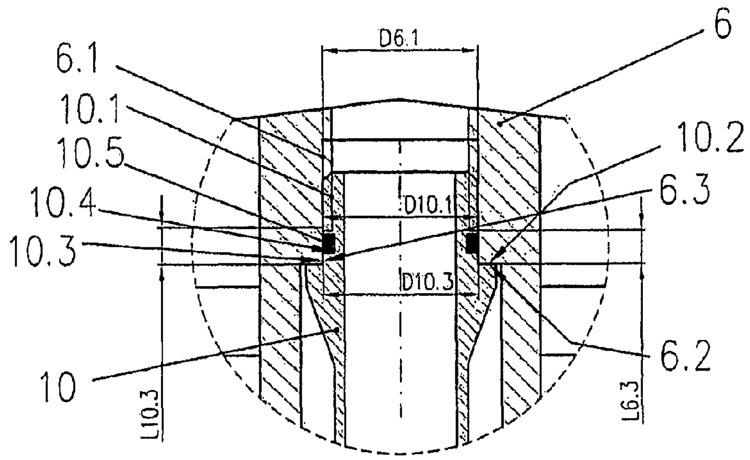
FIG. 11 shows details of the connection between the electrode holder and the cooling tube of the plasma torch head shown in FIG. 9.

FIG. 9 shows a further particular embodiment of a plasma torch head 1 in accordance with the invention, which differs from the embodiment shown in FIGS. 1 to 8 in the design of the front internal portion 10.8 of the cooling tube 10 (see also FIG. 10). The length L10.8 of the internal portion 10.8 is shorter, as a result of which the flow cross-section is increased considerably only in the front-most region. The lengths of the front internal portion 10.8 and the front external portion 10.10. are identical here. In addition, in the region in which the electrode holder 6 and the cooling tube 10 are screwed together, there is a groove 10.4 in the cylindrical outer surface 10.3 of the cooling tube 10, with an O-ring 10.5 disposed in the groove for sealing purposes (see also FIG. 11).

Figure 12:
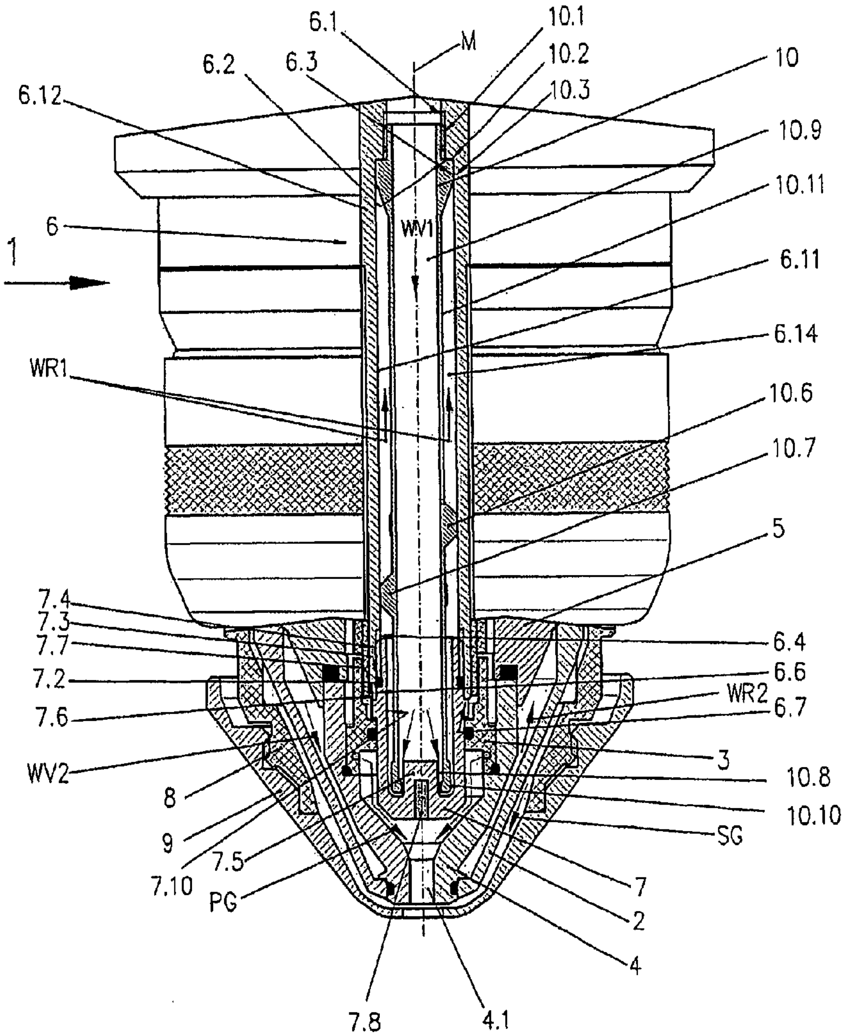
FIG. 12 shows a longitudinal sectional view through a plasma torch head in accordance with a contemplated particular embodiment of the present invention.
Figure 13:
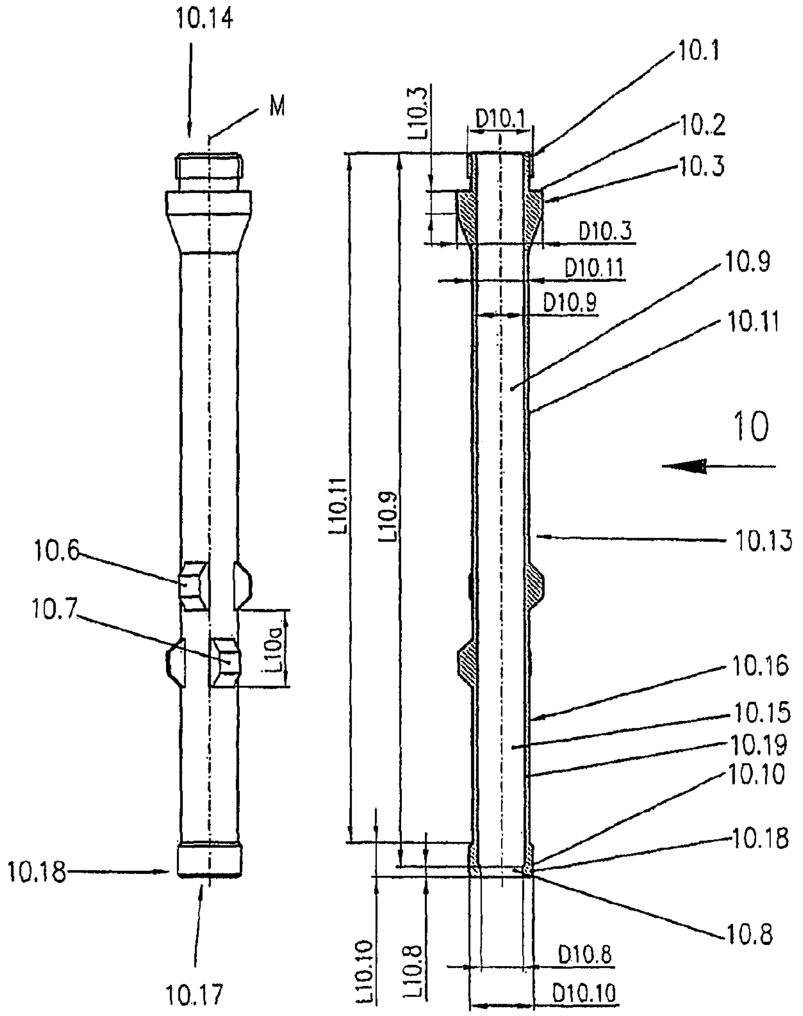
FIG. 13 shows an individual view of a cooling tube of the plasma torch head shown in FIG. 12, seen from above (left) and in a longitudinal sectional view (right)
Figure 14:
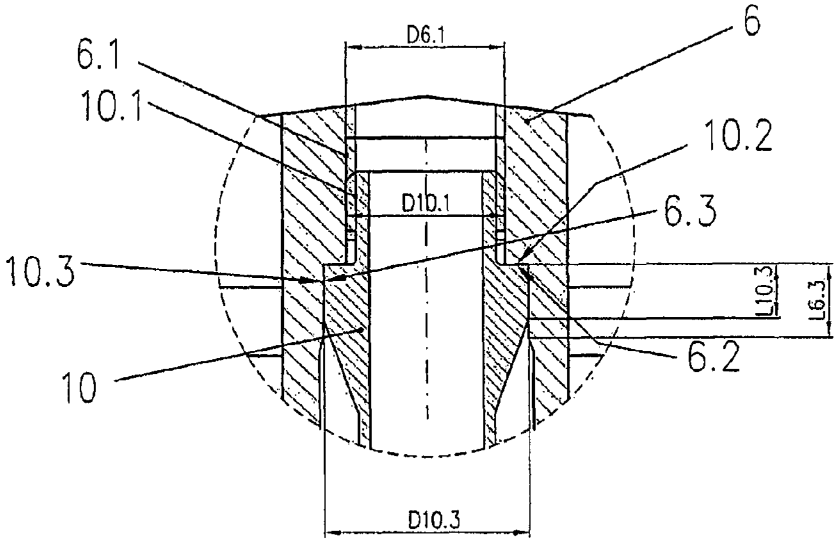
FIG. 14 shows details of the connection between the electrode holder and the cooling tube of the plasma torch head shown in FIG. 12.

FIG. 12 shows a further particular embodiment of a plasma torch head of the invention, which differs from the two embodiments shown in FIGS. 1 to 11 in the design of the front internal portion 10.8 of the cooling tube 10 (see also FIG. 13). The length L10.8 of the internal portion 10.8 is shorter than in FIG. 1, and the length L10.10 of the front external portion 10.10 is greater than in FIG. 9. As a result, the flow resistance of the overall arrangement is reduced, since narrow gaps are only found in the front-most part between the cooling tube and the electrode.

The centring between the cooling tube 10 and the electrode holder 6 is likewise achieved by means of a cylindrical inner surface 6.3 and a cylindrical outer surface 10.3. These are, however, arranged differently from what is shown in FIGS. 1 and 9. As a result of this arrangement, the cylindrical centring surfaces are enlarged. This further improves the centring and is achieved by changing the order "thread-centring surface-stop face" to "thread-stop face-centring surface". A further advantage is that the size of the unit is not increased. If the order were retained, the stop face would have to have a different diameter from the centring surface.

Figure 15:
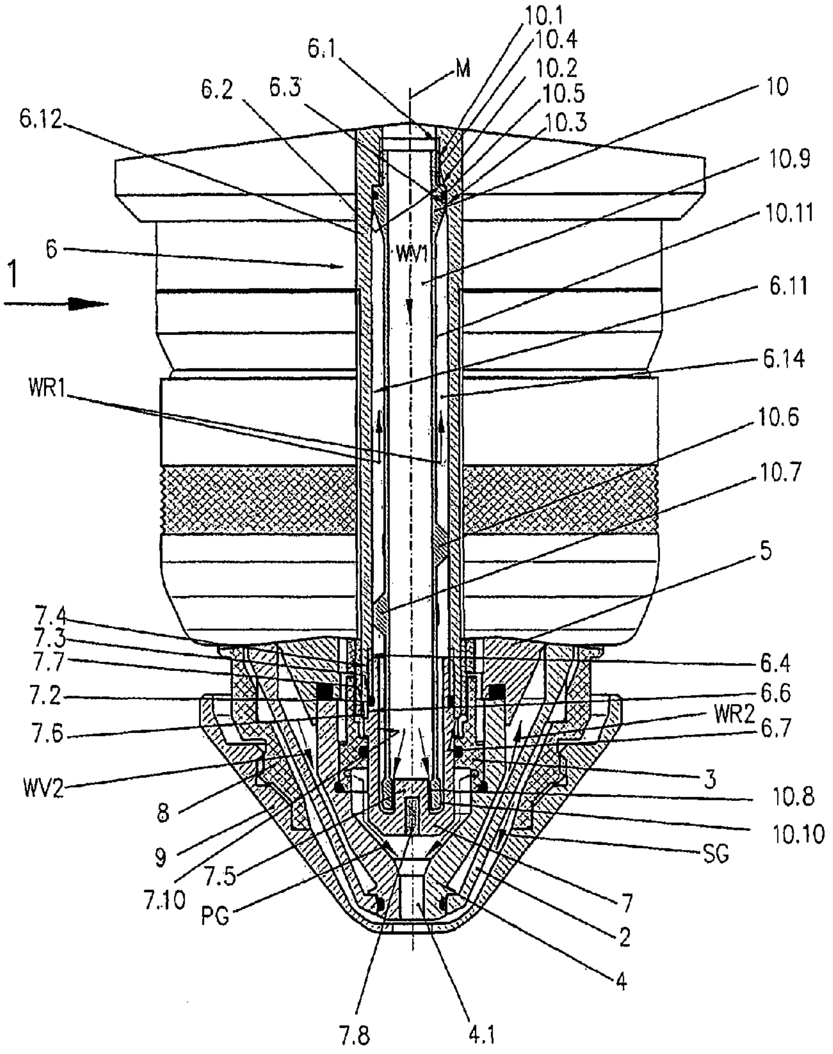
FIG. 15 shows a longitudinal sectional view through a plasma torch head in accordance with a contemplated particular embodiment of the present invention.
Figure 16:
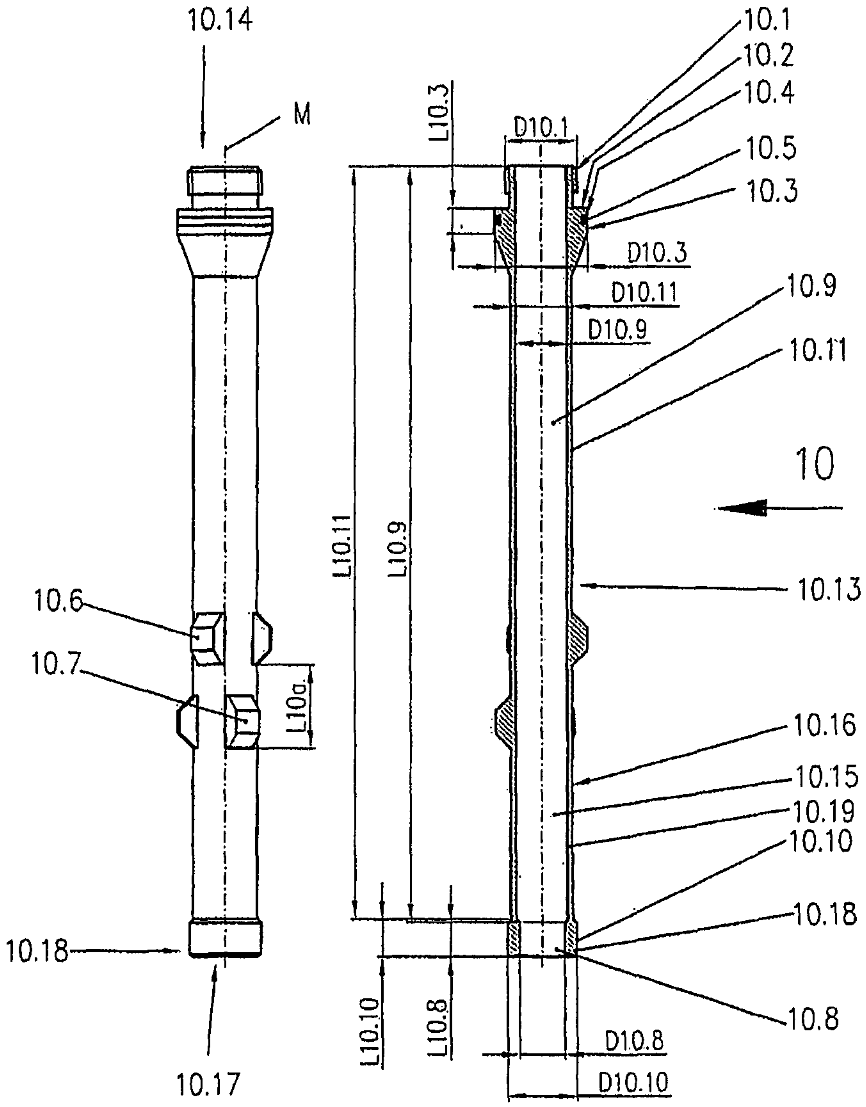
FIG. 16 shows an individual view of a cooling tube of the plasma torch head shown in FIG. 15, seen from above (left) and in a longitudinal sectional view (right)

FIG. 15 shows a further special embodiment of the plasma torch head of the invention. It differs from the embodiment of FIG. 1 in the design of the front internal portion 10.8 of the cooling tube 10 (see also FIG. 16). The lengths of the front internal portion 10.8 and the front external portion 10.10. are identical here. In their length, these portions correspond to the region 7.5 of the electrode 7.

Figure 17:
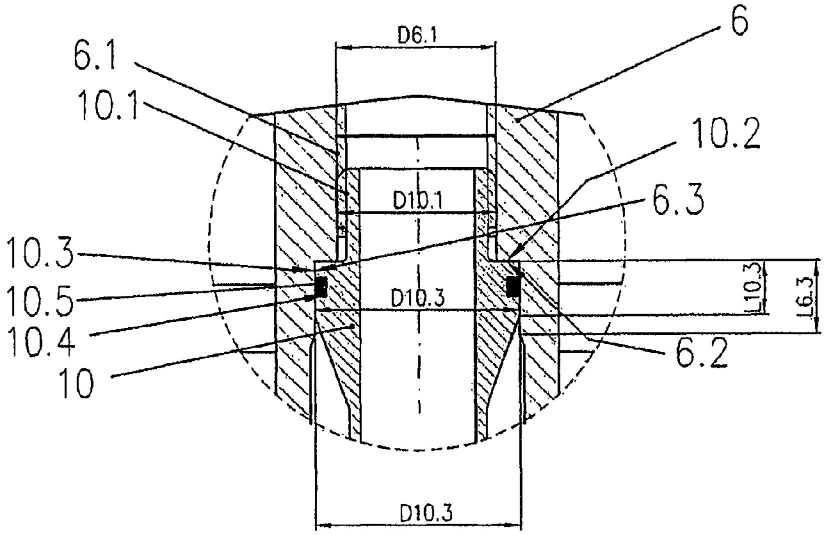
FIG. 17 shows details of the connection between the electrode holder and the cooling tube of the plasma torch head shown in FIG. 15.

Centring between the cooling tube 10 and the electrode holder 6 is achieved as in FIG. 12. In addition, in the region in which the electrode holder 6 and the cooling tube 10 are screwed together, there is a groove 10.4 in the cylindrical outer surface 10.3 of the cooling tube 10, with an O-ring 10.5 disposed in the groove for sealing purposes. That is illustrated in FIG. 17.

The features of the invention disclosed in the present description, in the drawings and in the claims can be essential to implementing the invention in its various embodiments both individually and in any combinations. It is contemplated that several modifications can be made to the embodiments described herein within the spirit and scope of the invention without departing from the anticipated scope of the claims.

The invention claimed is:

1. A cooling tube for an arc plasma torch, comprising:

an axial length of said cooling tube and a wall extending along at least a portion of said axial length;

an elongated tube body of said cooling tube having a rear end having an external thread, a front end for positioning said tube body within an open end of an electrode, and a coolant duct extending therethrough;

said front end having a bead-like thickening of said wall of said cooling tube pointing inwards, outwards, or both; and said wall having a plurality of projections, one offset from another with respect to both the longitudinal axis and the circumferential axis of said cooling tube.

2. The cooling tube of claim 1 wherein said thickening extends over at least one millimeter in a longitudinal direction of said cooling tube.

3. The cooling tube of claim 1 further comprising:

said wall having an external diameter and an internal diameter; and said thickening leads to an increase in said external diameter by at least 0.2 millimeters, to a reduction of said internal diameter by at least 0.2 millimeters, or both.

4. An arrangement of the cooling tube of claim 1 further comprising:

an electrode having a hollow elongated electrode body with an open end for arranging the front end of said cooling tube and a closed end; and said open end having a bottom surface with a projecting region, over which said front end of said cooling tube extends, and said thickening extends in a longitudinal direction over at least said projecting region.

5. The arrangement of claim 4 further comprising:

an electrode holder having an elongated holder body with a holder end for receiving said electrode and a hollow interior, said cooling tube projecting into said hollow interior.

6. The arrangement of claim 5 further comprising a first group of projections arranged peripherally and spaced apart from one another.

7. The arrangement of claim 6 further comprising:

a second group of projections, the projections of said second group of projections being arranged peripherally and spaced apart from one another; and said second group of projections being offset axially relative to said first group of projections.

8. The arrangement of claim 6 further comprising:

a second group of projections, the projections of said second group of projections being arranged peripherally and spaced apart from one another; and said second group of projections being offset peripherally relative to said first group of projections.

9. A cooling tube for an arc plasma torch comprising:

an elongated tube body of said cooling tube having a rear end which can be releasably connected to an electrode holder of said arc plasma torch, and a coolant duct extending therethrough;

an external thread for releasably connecting said rear end to an electrode holder;

a cylindrical outer surface adjoining said external thread for centering said cooling tube relative to said electrode holder; and said outer surface having a plurality of projections, one offset from another with respect to both the longitudinal axis and the circumferential axis of said cooling tube.

10. The cooling tube of claim 9 further comprising a stop face for axially fixing said cooling tube in said electrode holder.

11. The cooling tube of claim 9 wherein said cylindrical outer surface has a peripheral groove.

12. The cooling tube of claim 9 further comprising:

a stop face for axially fixing said cooling tube in said electrode holder;

said cylindrical outer surface having a peripheral groove; and an O-ring disposed in said peripheral groove for sealing purposes.

13. The cooling tube of claim 9 wherein said cylindrical outer surface has an external diameter that is at least the same size as or larger than a maximum external diameter of said external thread.

14. The arrangement of claim 6 further comprising a second group of projections arranged peripherally and spaced apart from one another, each projection non-overlappingly offset, on the longitudinal axis of said cooling tube, from each projection in said first group of projections.

15. The arrangement of claim 6 further comprising a second group of projections arranged peripherally and spaced apart from one another, each projection non-overlappingly offset, on both the longitudinal and circumferential axes of said cooling tube, from each projection in said first group of projections.

16. An arrangement of a cooling tube for an arc plasma torch, comprising:

an elongated tube body of said cooling tube having a rear end releasably connected to an electrode holder of an arc plasma torch and a coolant duct extending therethrough;

an electrode holder for an arc plasma torch, said electrode holder having an elongated holder body with a holder end for receiving an electrode and a hollow interior; and said cooling tube having an outer surface, a plurality of projections positioned on said outer surface for centering said cooling tube in said electrode holder with a projection offset from another on both the longitudinal and circumferential axes of said cooling tube.

17. The arrangement of claim 16 wherein a first group of projections arranged peripherally and spaced apart from one another.

18. The arrangement of claim 16 further comprising:

a first group of projections arranged peripherally, and spaced apart from one another;

a second group of projections being provided, arranged peripherally and spaced apart from one another; and said second group of projections being offset axially relative to said first group of projections.

19. The arrangement of claim 16 further comprising:

a first group of projections being provided, arranged peripherally, and spaced apart from one another;

a second group of projections being provided, arranged peripherally and spaced apart from one another;

said second group of projections being offset axially relative to said first group of projections; and said second group of projections being offset peripherally relative to said first group of projections.

20. The arrangement of claim 16 further comprising a first group of projections arranged peripherally and spaced apart from one another; and a second group of projections arranged peripherally and spaced apart from one another, each projection non-overlappingly offset, on the longitudinal axis of said cooling tube, from each projection in said first group of projections.

21. The arrangement of claim 16 further comprising a first group of projections arranged peripherally and spaced apart from one another; and a second group of projections arranged peripherally and spaced apart from one another, each projection non-overlappingly offset, on both the longitudinal and circumferential axes of said cooling tube, from each projection in said first group of projections.

* * * * *